(12) United States Patent
Moran et al.

(10) Patent No.: US 10,175,900 B2
(45) Date of Patent: *Jan. 8, 2019

(54) REMOVABLE, ACTIVE, PERSONAL STORAGE DEVICE, SYSTEM AND METHOD

(71) Applicant: Innovative Memory Systems, Inc., Costa Mesa, CA (US)

(72) Inventors: Dov Moran, Kafar Subar (IL); Gidi Elazar, Tsur Yigal (IL); Dan Harkabi, Moshav Lahish (IL)

(73) Assignee: INNOVATIVE MEMORY SYSTEMS, INC., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,092

(22) Filed: Aug. 8, 2017

(65) Prior Publication Data

US 2017/0357460 A1 Dec. 14, 2017

Related U.S. Application Data

(63) Continuation of application No. 14/457,096, filed on Aug. 11, 2014, now Pat. No. 9,864,535, which is a (Continued)

(51) Int. Cl.
*G06F 3/06* (2006.01)
*G06F 21/32* (2013.01)
(Continued)

(52) U.S. Cl.
CPC .......... *G06F 3/0622* (2013.01); *G06F 3/0664* (2013.01); *G06F 3/0679* (2013.01); *G06F 21/32* (2013.01); *G06F 21/72* (2013.01); *H04L 9/3234* (2013.01); *G06F 12/1458* (2013.01); *H04L 2209/60* (2013.01)

(58) Field of Classification Search
CPC ...... G06F 3/0622; G06F 21/32; G06F 3/0679; G06F 21/72; G06F 3/0664; G06F 12/1458; H04L 9/3234; H04L 2209/60
See application file for complete search history.

(56) References Cited

U.S. PATENT DOCUMENTS 4,816,653 A * 3/1989 Anderl ................. G06Q 20/341
235/380
5,261,055 A * 11/1993 Moran ................. G11C 16/102
710/14

(Continued)

*Primary Examiner* — Matthew Smithers
(74) *Attorney, Agent, or Firm* — Imperium Patent Works LLP; Mark D. Marrello (57) ABSTRACT

A storage device is configured to communicate with a host device over a Bluetooth connection. The storage device includes a flash memory, a processor, and a Bluetooth controller. The memory stores at least one permission for determining access to the memory. The processor manages access to the memory, independently of the host device, based on a comparison of a request at the removable storage device to access the memory to at least one permission. The comparison is independent, requiring no management by an operating system of the host device, such that if the at least one permission includes a particular access type that matches the access requested in the request, the processor provides access to the memory.

17 Claims, 6 Drawing Sheets

Related U.S. Application Data continuation of application No. 13/448,121, filed on Apr. 16, 2012, now Pat. No. 8,826,043, which is a continuation of application No. 10/089,188, filed as application No. PCT/IL00/00555 on Sep. 10, 2000, now abandoned, which is a continuation of application No. 09/550,491, filed on Apr. 17, 2000, now Pat. No. 6,539,380, which is a continuation of application No. 09/409,091, filed on Sep. 30, 1999, now Pat. No. 6,324,537.

(51) Int. Cl.
*G06F 21/72* (2013.01)
*H04L 9/32* (2006.01)
*G06F 12/14* (2006.01)

(56) References Cited

U.S. PATENT DOCUMENTS

| | | | | |
|---|---|---|---|---|
| 5,887,145 | A * | 3/1999 | Harari | G06F 13/4068 710/13 |
| 5,922,073 | A * | 7/1999 | Shimada | G06F 21/6218 726/6 |
| 6,324,537 | B1 * | 11/2001 | Moran | G06F 21/6218 707/758 |
| 6,539,380 | B1 * | 3/2003 | Moran | G06F 21/32 707/783 |
| 8,826,043 | B2 * | 9/2014 | Moran | G06F 21/32 711/103 |
| 9,864,535 | B2 * | 1/2018 | Moran | G06F 3/0622 |

* cited by examiner

Figure 3 (con't)

REMOVABLE, ACTIVE, PERSONAL STORAGE DEVICE, SYSTEM AND METHOD

CROSS REFERENCE TO RELATED APPLICATION

This application is a continuation of, and claims priority under 35 U.S.C. § 120 from, nonprovisional U.S. patent application Ser. No. 14/457,096 entitled "Removable, Active, Personal Storage Device, System and Method," filed on Aug. 11, 2014. Application Ser. No. 14/457,096 in turn is a continuation of, and claims priority under 35 U.S.C. § 120 from, nonprovisional U.S. patent application Ser. No. 13/448,121 entitled "Removable, Active, Personal Storage Device, System and Method," filed on Apr. 16, 2012, which issued as U.S. Pat. No. 8,826,043. Application Ser. No. 13/448,121 in turn is a continuation of, and claims priority under 35 U.S.C. § 120 from, nonprovisional U.S. patent application Ser. No. 10/089,188 entitled "Removable, Active, Personal Storage Device, System and Method," filed on Jul. 2, 2002. Application Ser. No. 10/089,188 in turn is a continuation of, and claims priority under 35 U.S.C. § 120 and § 371 from International Application No. PCT/IL00/00555, filed on Sep. 10, 2000, and published as WO 2001/23987 on Apr. 5, 2001. International Application No. PCT/IL00/00555 in turn claims priority from U.S. patent application Ser. No. 09/550,491 entitled "Device, System and Method for Data Access Control," filed on Apr. 17, 2000, which issued as U.S. Pat. No. 6,539,380. U.S. patent application Ser. No. 09/550,491 in turn claims priority from U.S. patent application Ser. No. 09/409,091 entitled "Device, System and Method for Data Access Control," filed on Sep. 30, 1999, which issued as U.S. Pat. No. 6,324,537. The subject matter of each of the foregoing documents is incorporated herein by reference.

FIELD AND BACKGROUND OF THE INVENTION

The present invention relates to a device, a system and method for removable, active, personal storage, and in particular for such a device, system and method which are suitable for operation with multiple computational devices at remote access points.

Computers are useful for the storage, retrieval and manipulation of data. Currently, many different types of electronic data storage devices are used in conjunction with computers. These electronic storage devices may be located externally or internally to the computer with which the storage device is in communication. For example, a magnetic storage device, such as hard disk drive, could be located internally to the computer, in direct communication with the system bus of the computer and operated by the CPU (central processing unit) of the computer. Flash memory, which is both readable and writable non-volatile memory, is a physically smaller storage device, which may be located within the physical case of the computer, and which is also connected to the system bus and operated by the CPU.

Removable storage media may also be used to store data, in which a hardware device, or "drive", for reading from and/or writing to the storage medium, is connected to the system bus of the computer. Examples of removable storage media include, but are not limited to, optical disks, CD-ROM disks and floppy diskettes. At some level, all of these various hardware devices are in communication with the computer which operates the device, regardless of the location of the electronic storage device. Therefore, access to the data is provided through such a computer.

There are a number of important aspects for data storage, particularly given the prevalence of communication through the Internet. First, data storage should be secure. Second, data storage should be accessible at multiple locations, such that the user can access the data at more than one access point. Unfortunately, these two goals are directly contradictory, as permitting access to the data from multiple access points significantly decreases the security of the data. A third important aspect of data storage is personalization, such that the user who owns the data is able to access it quickly and easily, yet such access is blocked to other, non-authorized users. None of these aspects is satisfied by currently available solutions which are known in the art.

As an example, with regard to data security, currently, most forms of data access control are implemented as software programs, which have a number of disadvantages. For example, these programs may be "hacked" or overcome by an unauthorized user, who can then gain access to the data. Such a disadvantage has become more acute with the advent of networks, distributed data storage and "client-server" applications, all of which increase the number of access points to the computer through which the electronic storage device is accessed, and hence to the stored data on that device. Such an increased number of access points also potentially increase the ability of an unauthorized user to access the data. Thus, software programs are clearly not adequate protection for data stored in a networked environment with multiple access points.

Another type of data access control is provided through the operating system of the computer itself. For example, UNIX and other operating systems typically allow an authorized user to determine the level of permissions associated with a particular file and/or sub-directory, which could be "read-only", "read/write" and so forth. Unfortunately, such permissions are often relatively simple, only differentiating between "read" and "write" for example. Also, like other types of software programs, these operating systems may be "hacked" by an unauthorized user, who can then gain access to the data.

In addition, if the electronic hardware storage device itself is stolen, then typically the data becomes completely unprotected, such that any unauthorized user can easily gain access to the data on the storage device. Neither software programs nor the operating system of the computer can overcome this problem, since they are stored and implemented separately from the storage device itself.

A more useful solution would be implemented with the hardware of the electronic storage device in a more integrated manner, such that even if the storage device itself is stolen, the data could not be easily accessed. Furthermore, such integration would increase the difficulty of access by an unauthorized user, whether to a network or to the local storage device itself. Furthermore, such a device should be portable, so that the user could transport the device and retrieve the data at remote locations. The overall solution should also permit personalization of the data storage and retrieval functions. Unfortunately, such a solution is not currently available.

There is thus an unmet need for, and it would be useful to have, a device, a system and a method for removable, active, personal storage, which does not rely on separately stored software programs, which is optionally integrated with the hardware of the storage device, and which is highly portable for use by the user at multiple locations.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

The present invention is of a device, a method and a system for providing removable, active, personal storage. The device itself features sufficient computational power and resources to perform various tasks with regard to data storage and retrieval. In particular, these resources are provided such that the management of the memory of the storage device is performed at the device level, rather than requiring management by an external operating system, such as the operating system of an external computational device for example.

At a minimum, the device features a data processor of some type for executing instructions related to memory management, a flash memory device for storing the data and instructions, and some type of connector for connecting the device to an external computational device. For example, such a connection could optionally be made with a USB controller and a USB connector at the device, for connecting the active device through the USB bus of the external computational device. Alternatively, the connection could optionally be made through a Bluetooth-enabled transceiver at the device itself and at the external computational device. Preferably, the present invention is implemented as an active data device, such as a chip for example, which more preferably controls access to the network. This implementation is preferred, since such electronic devices are more difficult to "hack" for access by an unauthorized user.

The device of the present invention may optionally be implemented in a number of different ways, all of which are considered to be within the scope of the present invention, including but not limited to, devices connected to a computer through any suitable hardware connection interface; a single chip with a microprocessor and firmware for operating the access features.

According to the present invention, there is provided a device for controlling access to a resource, access being provided through a host device having a USB bus, the device comprising: (a) an input for receiving a request to access the resource; (b) a flash memory device for storing at least one permission for determining access to the resource; (c) a flash memory controller for controlling said flash memory device; (d) a processor for executing said at least one instruction and for comparing said request to said at least one permission, such that if said at least one permission includes a type of access requested in said request, access to the resource is provided, and alternatively if said at least one permission does not include a type of access requested in said request, access to the resource is not provided; and (e) a USB interface controller for communicating with the USB bus of the host device and, if permitted, for transmitting data from said processor.

Hereinafter, the terms "computer user" and "user" both refer to the person who operates a computer which is in communication with a data storage device.

Hereinafter, the term "computer" refers to a combination of a particular computer hardware system and a particular software operating system. Examples of such hardware systems include those with any type of suitable data processor. Hereinafter, the terms "computer" or "computational device" include, but are not limited to, personal computers (PC) having an operating system such as DOS, Windows™, OS/2™ or Linux; MacOS™, Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device; any other device featuring known and available operating system; as well as any type of device which has a data processor of some type with an associated memory. Hereinafter, the term "Windows™" includes but is not limited to Windows95™, Windows NT™, Windows98™, Windows CE™ Windows 2000™, Windows ME™ and any upgraded versions of these operating systems by Microsoft Corp. (USA).

Hereinafter, the term "biometric detection device" refers to any type of device which is capable of capturing data with regard to a biological parameter of a user, including, but not limited to, a fingerprint detection device and a device which performs a retinal scan.

For the present invention, a software application could be written in substantially any suitable programming language, which could easily be selected by one of ordinary skill in the art. The programming language chosen should be compatible with the computer by which the software application is executed, and in particularly with the operating system of that computer. Examples of suitable programming languages include, but are not limited to, C, C++ and Java.

Furthermore, the functions of the present invention, when described as a series of steps for a method, could be implemented as a series of software instructions for being operated by a data processor, such that the present invention could be implemented as software, firmware or hardware, or a combination thereof.

DETAILED DESCRIPTION OF THE DRAWINGS

The present invention is of a device, a method and a system for providing removable, active, personal storage. The device itself features sufficient computational power and resources to perform various tasks with regard to data storage and retrieval. In particular, these resources are provided such that the management of the memory of the storage device is performed at the device level, rather than requiring management by an external operating system, such as the operating system of an external computational device for example. At a minimum, the device features a data processor of some type for executing instructions related to memory management, a flash memory device for storing the data and instructions, a flash controller for controlling access to a flash memory device and some type of connector for connecting the device to an external computational device. For example, such a connection could optionally be made with a USB controller and a USB connector at the device, for connecting the active device through the USB bus of the external computational device. Alternatively, the connection could optionally be made through a Bluetooth-enabled transceiver at the device itself and at the external computational device.

Optionally and preferably, the present invention also features an authenticator, for identifying and authenticating the user. Such an authenticator may optionally and more preferably feature a biometric detection device, which collects a biological parameter of the user in order to identify the user. Examples of different types of biological parameters which optionally could be collected with such a biometric detection device include, but are not limited to, fingerprint, face image recognition, retinal print, iris image analysis, hand geometry, voice analysis, ear shape, detection of odor of the user, palm print and finger geometry. Once the biological parameter has been collected, in a step which is also termed "enrollment", the biological parameter data is analyzed. This analysis involves the extraction of at least one, and preferably a plurality of, features of the pattern of the biological parameter. For identification of the user, these feature(s) are compared to stored data which was previously captured from the user. If a sufficient number of points of similarity are found, then the user is considered to be identified. If the identified user has the necessary permission(s), then the operation is performed and/or access is provided by the device according to the present invention.

In addition, optionally and more preferably, the present invention features an encryption engine for encrypting data which is transmitted, and for decrypting received data, such that data security is maintained for the transmission of the data. Most preferably, the encryption engine is implemented as a chip or other hardware device and/or component of the present invention, for greater portability and more efficient operation of the encryption/decryption procedure.

The authentication and encryption operations are optionally and most preferably combined in the present invention through the employment of a cryptographic device, preferably implemented as a chip. The cryptographic device enables security operations such as authentication of the device to the system to which the external host computational device is connected, encryption and decryption of data, verification of the authenticity of data and so forth. An example of a standard algorithm implemented in a cryptographic device is RSA, known also as private/public key protocol, which is based on a private, confidential code (or data stream), and a public code that the owner of the device may publish. Another party can use the public key to authenticate the owner of the device, for example in order to permit them to access information or perform operations in the system. By exchanging public keys with another party, the system enables each party to authenticate the other party and to communicate securely. Another example is DES, which enables high-speed encryption and decryption of data. Cryptographic protocols that may be implemented in the device include, but are not limited to DES, Triple-DES, SSL, DH/DSS, IDEA, CAST and RSA.

Preferably, the present invention will execute the cryptographic functions by emulating a smart-card. A smart card is a standard implementation of cryptographic functionality in a cryptographic system. The smart card is typically constructed in the form of a credit card which has an internal cryptographic chip. The interface to the cryptographic chip is defined in the smart card standard. The interface adapter between a smart card and a computational device is through a smart-card reader. Commercial security systems for processing secured operations based on authentication using a smart card are available. Unfortunately, smart-card readers are not common devices and are not installed on most computational devices. The present invention has the advantage of providing the functions of a smart card, and of emulating the interface to a smart card, but through a common interlace adapter to the computational device. Most preferably, the cryptographic chip stores encrypted smart card data.

Optionally and preferably, the cryptographic chip performs encryption immediately upon receiving a command from the data processor of the active device. Alternatively or additionally and preferably, the cryptographic chip creates a cryptographic signature with a hash immediately upon receiving a command from the data processor of the active device.

The cryptographic chip may also optionally feature a cryptographic chip memory for storing at least one cryptographic key and at least one cryptographic instruction for encrypting and decrypting data, such that the cryptographic chip forms a removable encryption engine together with the active device. Encrypted data could then be stored on the cryptographic chip memory. Such a cryptographic chip memory is also optionally implemented as a separate flash memory device from the flash memory device of the active device, or alternatively the cryptographic chip memory is the flash memory device of the active data device of the present invention. Alternatively the cryptographic chip memory is a separate EEPROM or a combination of an EEPROM and flash memory as described above.

Preferably, the present invention is implemented as an active data device, such as a chip for example, which more preferably controls access to the network. This implementation is preferred, since such electronic devices are more difficult to "hack" for access by an unauthorized user.

The present invention has many different and optional applications and implementations, such as for controlling access to the data stored on the device; controlling access to a network resource; controlling access to credit card information; for identifying a user according to a PIN, biometric or other identification information; for controlling access to a particular location according to the identity of the user; for securing communication with another computational device, and for controlling access to various types of data files, such as music files in the MP3 format and so forth. Indeed, the present invention may optionally be implemented for use with an MP3 player, which is a device capable of playing MP3 files. In such an implementation, the device of the present invention would also preferably feature an additional interface for communicating with the MP3 player. Thus, the present invention provides a more secure solution for the control of access.

The device of the present invention may optionally be active in initiating interaction with other computational devices. For example upon attachment of the device to a computational device with potential access to the Internet, the device may activate processes in the computational device for initiating a connection to the Internet, or to another computational device or a specific resource such as a particular Web site on the Internet. Another example is that the device may accumulate data transactions, such as purchase transactions performed through the Internet, and initiate the process of sending the transactions to the owner of the device.

The device of the present invention may optionally be implemented in a number of different ways, all of which are considered to be within the scope of the present invention. For example, the device of the present invention may be implemented as a removable device for temporary connection to a computer, or alternatively may be implemented as a permanent peripheral device. The device may optionally be connected through any suitable hardware connection interface, for example. As another option, the device may feature a single chip with a microprocessor and firmware for operating the data access features. Alternatively, the device may be composed of a plurality of separate functional units which are not combined in a single chip. The implementation of the system may optionally include software applications executing on the computational device to which the device is attached, and/or to other computational devices attached to the Internet.

According to a preferred embodiment of the present invention when implemented as a USB computational device, the device itself is connected to another computational device and/or network through a flexible USB connector. The USB connector in a typical background art computer workstation or laptop is usually located near other connectors or devices. Each computer vendor locates the connector in a different location with different surroundings, which may include other types of connectors and/or ports. If these other near connectors are in use, the device of the present invention may not have sufficient space to be inserted into the USB port. The provision of a flexible USB connector solves this problem. In addition, the USB connector according to the present invention more preferably features a protector of some type, in order for the USB connector to be kept without being damaged or accumulating dirt.

The advantage of the present invention is that memory management is locally provided by an active device, such that an additional computational device is not required in order to control the operations of the present invention. Therefore, the present invention is operating system-independent. At the time of connection between the device of the present invention and an external computational device, the CPU of the host external computational device negotiates with the present invention. The USB interface of the present invention is more preferably a generic driver, which can then be automatically adjusted for interaction with the operating system of the host computational device. A specific driver for memory management of the device of the present invention, operated by the operating system of the host computational device, is not required since the device of the present invention performs housekeeping and other memory management functions locally. Thus, the present invention is far more flexible than other devices which are known in the art, as these latter known devices cannot provide the active device functions of the present invention.

The principles and operation of a device, a system and a method according to the present invention may be better understood with reference to the drawings and the accompanying description, it being understood that these drawings are given for illustrative purposes only and are not meant to be limiting.

Figure 1:
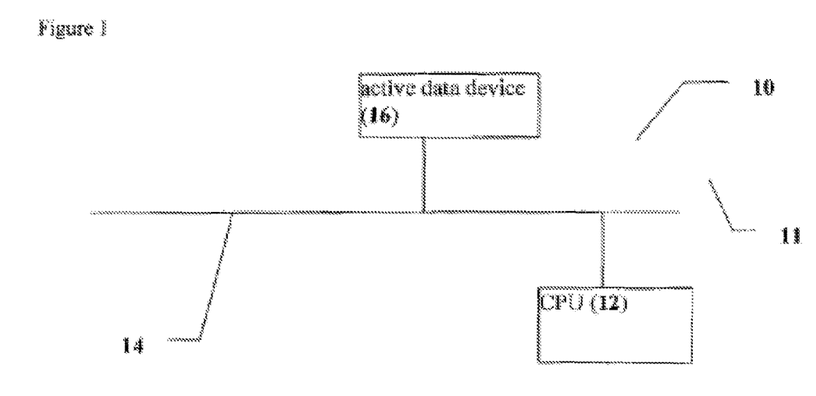
FIG. 1 is a schematic block diagram of an exemplary system according to the present invention.

Referring now to the drawings, FIG. 1 is a schematic block diagram of an illustrative, exemplary system according to the present invention for controlling data access. A system 10 features a computational device 11 which contains a CPU 12 for executing instructions, such as a request to read data for example. System 10 also features other computational devices 17 connected to computational device 11 through a network.

CPU 12 is connected to a bus 14. An active data device 16 is also connected to bus 14, such that active data device 16 is in communication with CPU 12 through bus 14. Bus 14 is preferably a USB (universal serial bus), although of course bus 14 may alternatively be implemented as any other suitable type of bus connection.

The user is preferably identified and authenticated by active data device 16, which then determines the type of access permitted to the user. Such access may optionally include access to local data storage of active data device 16 (not shown; see FIG. 2), and/or to one or more resources of computational device 11 (not shown). Generally, active data device 16 preferably determines whether the user is able to access information stored in the local storage of active data device 16, computational device 11, or other computational devices 17.

Active data device 16 is optionally implemented according to any one of a plurality of different specific embodiments. For example, active data device 16 could optionally be implemented as a chip, with a non-volatile memory which is both readable and writable, such as a flash memory device for example, some type of input for receiving a request for data, and a microprocessor. The chip is preferably implemented as a programmable ASIC.

Figure 2:
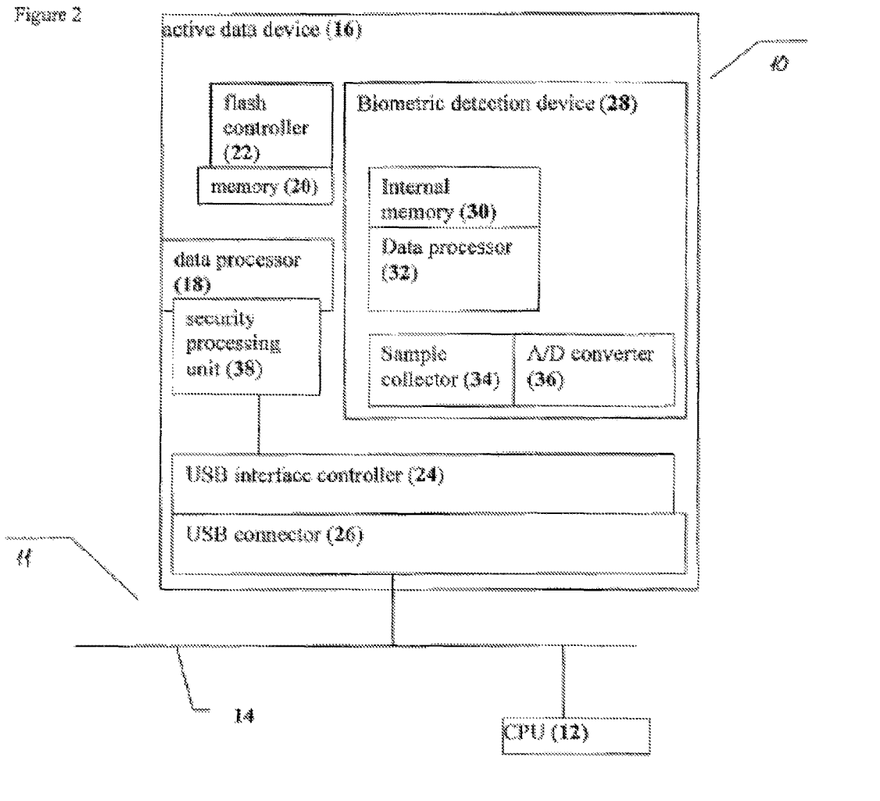
FIG. 2 is a schematic block diagram of a preferred embodiment of a system according to the present invention.

FIG. 2 shows a more detailed schematic block diagram of an exemplary implementation of active data device 16. Active data device 16 features a data processor 18, which operates instructions for controlling the functions of active data device 16, as well as for communicating with host external computational device 11. Data processor 18 reads these instructions from a memory component 20, which is preferably a flash memory device. In the preferred implementation, memory component 20 is controlled by a flash controller 22, which in turn receives commands from data processor 18 regarding access to the stored information in memory component 20.

Memory component 20 more preferably features instructions for memory management, such that data processor 18 is able to manage memory component 20 through flash controller 22, most preferably without requiring any type of management from an external computational device such as host external computational device 11. One example of a suitable memory management system for a flash memory is disclosed in U.S. Pat. No. 5,404,485, entitled "Flash File System", which is hereby incorporated by reference as if fully set forth herein.

According to a preferred embodiment of the present invention, memory component 20 also serves for storing data for the user, apart from data which is stored in order to facilitate the operation of active data device 16. Memory component 20 thus preferably acts as a local data storage device for the user, with the stored data being accessed by the user through commands sent to data processor 18. Optionally memory 20 is external to active device 16 ASIC.

Active data device 16 communicates to external devices, such as host computational device 11, through a USB interface controller 24 and a USB connector 26. USB interface controller 24 and USB connector 26 in turn communicate with CPU 12 through USB bus 14, for transmitting and receiving data.

The operation of these components of active data device 16 may optionally be performed as follows. Once the correct type of access for the user has been determined, active data device 16 communicates with CPU 12 of computational device 11 through USB bus 14. In this case, computational device 11 is the USB host, while active data device 16 is considered to be a slave device, such that only computational device 11 is empowered to initiate a communication session. Active data device 16 features USB interface controller 24, which is a chip for translating digital data into analog signals. These signals are then sent through USB connector 26 to USB bus 14. USB connector 26 is optionally and more preferably implemented as a flexible connector, such that USB connector 26 can be connected to USB bus 14 regardless of the structure and layout of the surrounding ports, for other connectors and peripheral devices. In addition, USB connector 26 according to the present invention more preferably features a protector of some type, in order for USB connector 26 to be kept without being damaged or accumulating dirt.

The operation of the internal components of active data device 16 with regard to computational device 11 is optionally and preferably performed as follows, it being understood that this is only one exemplary method for performing such an interaction. First, data processor 18 initializes USB interface controller 24, as well as memory component 20, and optionally a security processing unit 38 and/or a biometric detection device 28, as described in greater detail below. Next, USB interface controller 24 waits for an initialization signal from computational device 11, which is the host device. Once the initialization signal has been received, data from computational device 11 is accepted.

As such data is transmitted, USB interface controller 24 signals data processor 18 that a message has been received. Data processor 18 then receives and analyzes the message. Data processor 18 performs one or more actions, as required by the contents of the message, and data is prepared for USB interface controller 24 to return to computational device 11.

Depending upon the contents of the message from computational device 11, data processor 18 may process and store data in memory component 20, for example, if the message contained a command to store data at active data device 16. Alternatively, as commanded by computational device 11, data processor 18 may read data from memory component 20, and then send the read data to USB interface controller 24 for transmission to computational device 11.

According to optional but preferred embodiments of the present invention, active data device 16 features biometric detection device 28 for the purpose of identifying a user. As for FIG. 1, access to computational device 11, as well as to an optional local data storage of active data device 16 at memory 20, as previously described, is provided through active data device 16. However, active data device 16 now determines access to computational device 11 and optionally local data storage according to the biological parameter of the user, which is measured by biometric detection device 28 for the purpose of identifying the user.

Biometric detection device 28 is optionally implemented according to a plurality of different embodiments. For example, biometric detection device 28 could be implemented as a fingerprint detection device or as a retinal scanning device. As a fingerprint detection device, biometric detection device 28 is optionally and preferably implemented as a FingerChip™ (Thomson-CSF Semiconducteurs Specifiques, France; see www.tcs.thomson-csf.com/Us/fingerchip/fc_home.htm as of Mar. 23, 2000). Biometric detection device 28 optionally and preferably contains an internal memory 30 for storing instructions on the scanning of fingerprints, and more preferably on the interpretation of such fingerprints with regard to stored fingerprint data. The stored fingerprint data is also optionally stored on internal memory 30, but alternatively is stored on memory component 20 of active data device 16. If biometric detection device 28 contains internal memory 30, then more preferably a data processor 32 is also present.

Biometric detection device 28 also includes a sample collector 34 for collecting a sample of the biological parameter. For example, for a fingerprint detection device, sample collector 34 preferably includes a thermal imaging fingerprint sensor for collecting the fingerprint data, as described in greater detail below. The fingerprint data is then optionally analyzed by biometric detection device 28, and more specifically by a software module which is stored in internal memory 30 and which is operated by data processor 32. Alternatively, the fingerprint data is analyzed by a software module being operated by active data device 16. Similarly, a retinal scan could be collected with sample collector 34, optionally implemented as a light scanner which is suitable for transmitting light into the eye of the user.

In an exemplary embodiment with the FingerChip™ device, sample collector 34 is optionally implemented with this device. The FingerChip™ device is a small silicon chip (smaller than the size of the fingertip), which is a thermal imaging sensor. Other types of sensors for collecting fingerprint data include, but are not limited to, optical sensors which use light in conjunction with a scanning device such as a CCD (charge-coupled device) camera for example; devices which sense capacitance; and combinations of such sensors (see www.tcs.thomson-csf.com/fingerchip/DownloadFAQ/faq.htm as of Mar. 23, 2000 for an explanation of the different devices, including the FingerChip™ device itself). Such a chip can optionally be connected to an analog-to-digital (A/D) converter 36 for converting the analog thermal signal to a digital signal. The digital signal is then optionally passed to data processor 32 for analysis, as described in greater detail below.

Once the biological parameter has been collected from the user and analyzed, the specific identity of the user can optionally be determined. Such a specific identity can then be used to determine the type of access which is to be granted to the user. Such access is preferably determined through the operation of data processor 18 for active data device 16, which preferably reads one or more instructions which are stored on memory component 20. These instructions contain information for correlating the identity of the user to various types of access which should be given to the user, optionally with a user profile for determining the preferences of the user for interacting with computational device 11 and/or local data storage provided through memory component 20.

As previously described, if memory component 20 is a flash ROM device, preferably memory component 20 features flash controller 22 for controlling interactions between data processor 18 and memory component 20. Optionally and more preferably, memory component 20 may also include a RAM (random access memory) device, to enable data processor 18 to perform the instructions contained on memory component 20, as well as to act as a communication buffer.

According to preferred embodiments of the present invention, active data device 16 features a security processing unit 38. Security processing unit 38 features an encryption engine for optional encryption of data which is transmitted to computational device 11, and decryption of any encrypted data which may be received from computational device 11. Security processing unit 38 features an authentication engine for storing authentication code(s) for the owner of the device. The authentication engine can participate in such an authentication process. Security processing unit 38 optionally features an authenticity algorithm which can affirm the authenticity of data. Security processing unit 38 is optionally and preferably implemented as a hardware device, such as chip, for more rapid performance and a more secure implementation of the encryption/decryption procedures.

Figure 3:
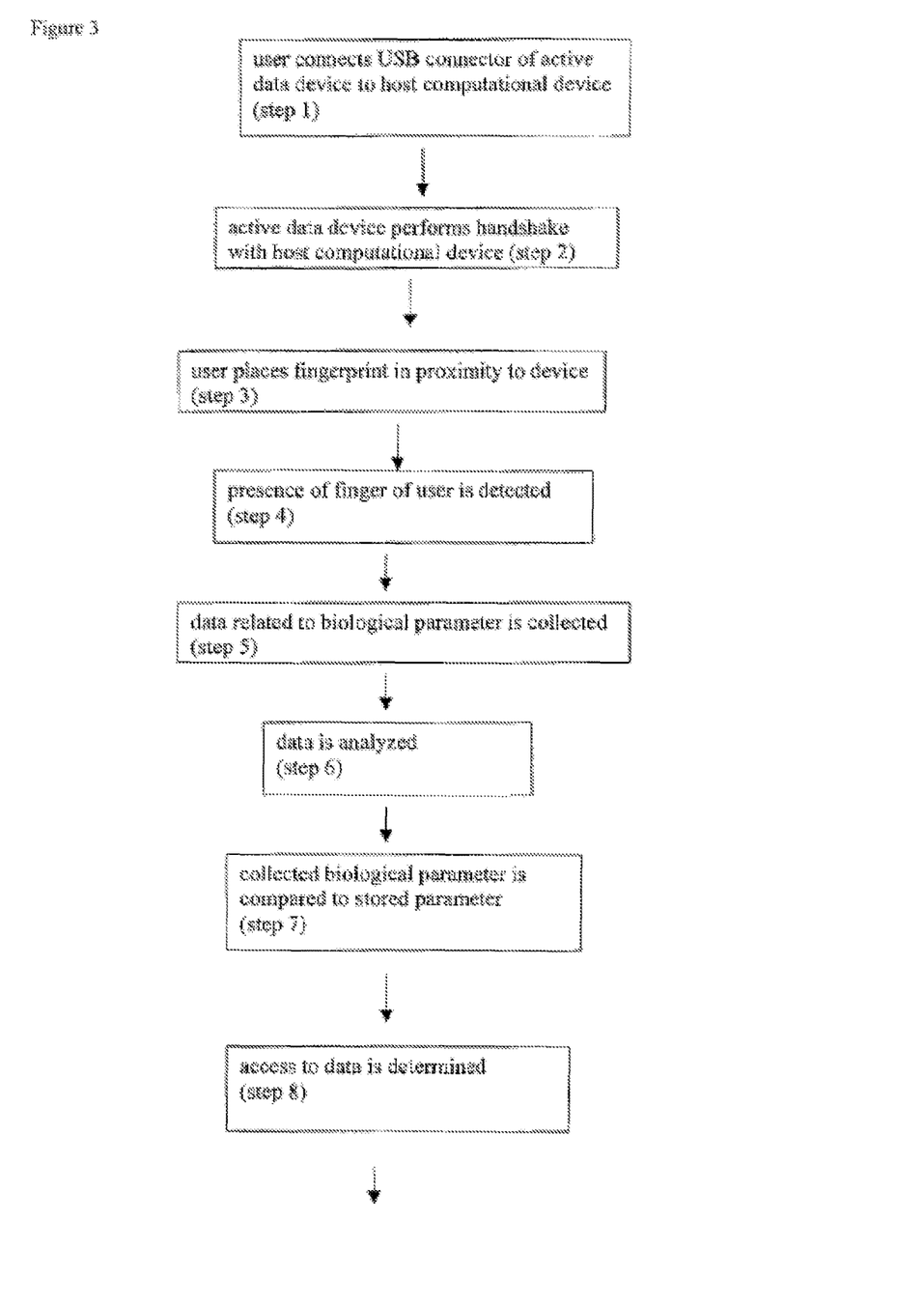
FIG. 3 is a flowchart of an exemplary method for operating the system of FIG. 2 according to the present invention.

FIG. 3 is a flowchart of an exemplary method according to the present invention for the operation of the preferred system of FIG. 2. This method is explained with regard to the detection of a fingerprint as a biological parameter for the purposes of illustration only and without any intention of being limiting. In addition, the method is also explained with regard to the use of the present invention for determining access to a network resource only for the purposes of illustration, and again without any intention of being limiting.

In step 1, the user connects the USB connector of the active data device to the host computational device. It should be noted that the active data device is preferably highly portable, such that the user could easily carry the active data device to each host computational device to which the active data device is to be connected.

In step 2, the active data device performs a handshake procedure with the host computational device, through the USB interface of the active data device and the USB bus of the host computational device, as previously described.

In step 3, according to preferred embodiments of the present invention, the user places a finger in proximity to the biometric detection device, in order to gain access to the requested network resource. For example, with regard to the FingerChip™ device, as described in greater detail above, the finger of the user is swept over the surface of the chip such that at least the pad of the fingertip of the user touches this chip.

In step 4, the biometric detection device detects the presence of the finger of the user in order to begin the collection procedure. For example, with regard to the FingerChip™ device, the presence of the fingertip is sensed by a thermal sensor, such that a sharp alteration in the thermal pattern indicates that the fingertip of the user is in proximity to the device (see www.tcs.thomson-csf.com/fingerchip/description/reconstr.htm as of Mar. 23, 2000 for an explanation of the entire detection and data collection procedure). Of course, other implementations of such a device may optionally employ alternate mechanisms.

In step 5, the data related to the biological parameter of the user is collected by the sample collector of the biometric detection device. For example, data acquisition may involve the collection of one or more images, such as the thermal images of the FingerChip™ device. Each such image is of at least a portion of the fingertip of the user. Optionally and preferably, a plurality of images are collected.

In step 6, the data is analyzed in order to determine whether the collected biological parameter of the user is a sufficiently close match to the stored identification information of a permitted user. The user is presumed to have provided a measurement of such a biological parameter previously, in order for this information to be stored for later comparison.

For example, for fingerprint detection, preferably the plurality of images (if collected) are assembled to form a single image. Next, the assembled image is analyzed for pattern detection, in order to compare at least one, and preferably a plurality of, points of similarity to the stored data.

In step 7, the biometric detection device, or alternatively the active data device if the two devices are implemented separately, determines whether the collected biological parameter is sufficiently similar to a stored pattern with the requisite permission, in order for the user to be granted access to the network resource. Optionally, a log may be kept of access attempts, and/or of unsuccessful access attempts.

In step 8, if the collected biological parameter is sufficiently similar to the stored pattern, then the user is given permission to access the requested data, such as at the host computational device and/or at the local data storage on the active data device itself. Alternatively, the user is not given permission to access the requested information, if the collected biological parameter is not sufficiently similar.

If the user is given permission to access the requested information, then in step 9, the data is retrieved, either from the local memory storage of the active data device, or alternatively from the data storage of the host computational device. Optionally and more preferably, the user may be given differential permission to access different types of data. More preferably, such differential permission is compared to the identification information about the user, such that the active data device is able to determine whether the user can perform the requested type of access on the particular data.

According to preferred embodiments of the present invention, the user may choose to transmit or receive encrypted data, in step 10. For example, if the user wants to send data from the local memory of the active data device to the host computational device, such data is optionally and more preferably encrypted by the active data device before being sent to the host computational device.

Optionally, in addition to the identification procedure described above, an authentication procedure is also performed for authenticating the user to the host computational device, for example. In this procedure, the identity of the user is preferably sent to the host computational device, optionally and more preferably with an authentication code. The host computational device then examines the identification and optional authentication code information, to determine if the user should be given access to one or more computational resources. If the host computational device authenticates the user according to the provided information, then the user is permitted access to one or more computational resources. Most preferably, the authentication process involves a multiple part handshake procedure between the active device and the host computational device, for a more secure authentication procedure. Optionally, the authentication process may also include authentication of the active device to a system, including a handshake procedure between a remote computational device, the active device and the host computational device. The remote computational device may be connected to the host computational device through the Internet.

Bluetooth is a standard for a wireless digital communications technology which is based on radio frequency (RF) transmission. Bluetooth is intended to interconnect computational devices such as home computers, hand held devices and peripherals. Therefore, the standard requires low power consumption, such that a relatively short-range connection between the receiver and the transmitter is also required.

Bluetooth devices are organized into networks, called "piconets", which contain small groups of such devices. A device which implements the Bluetooth technology, termed herein a "Bluetooth device", may be a master or a slave in a network of such devices. A piconet has one master device, and one or more slave devices which receive commands from the master device. A device may optionally belong to more than one piconet. A piconet is synchronized to a pattern of frequencies, in which all devices in the piconet communicate at the same frequency for a predetermined period of time, after which all devices transfer communication to the next frequency in the pattern. The master device chooses the frequency pattern to be used.

The Bluetooth standard features a discovery protocol for the dynamic formation of each particular Bluetooth network. The master device initiates the discovery process in order to locate other available slave devices. After a connection is established and the network has been formed, digital data can be transferred between the devices through the network.

Figure 4:
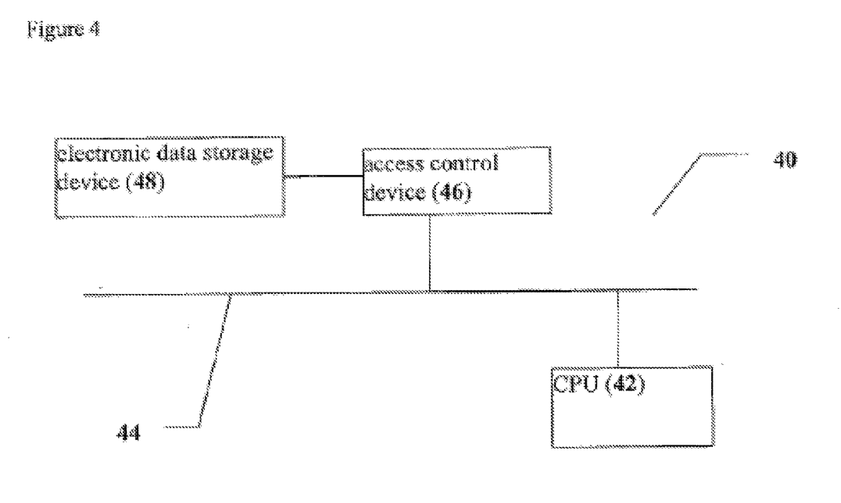
FIG. 4 shows another embodiment of the present invention, for an access control device for controlling access to data.

FIG. 4 shows another embodiment of the present invention, for an access control device for controlling access to data. This embodiment of the present invention may be active or passive, in that this embodiment may be composed of components which rely upon the management and control of the host computational device. Furthermore, such a device may optionally be implemented with the biometric detection device of FIG. 2, according to the method of FIG. 3. Alternatively or additionally, the device could be implemented with either Bluetooth or USB communication, as previously described.

As for FIG. 1, a system 40 features a CPU 42 for executing instructions, such as a request to read data for example. CPU 42 is connected to a bus 44. An access control device 46 is also connected to bus 44, such that access control device 46 is in communication with CPU 42 through bus 44. Bus 44 is preferably a USB (universal serial bus), although of course bus 44 may alternatively be implemented as any other suitable type of bus connection.

A data storage device 48 is in communication with access control device 46, such that any attempts to access data in data storage device 48 must pass through access control device 46. Preferably, as shown, data storage device 48 is not in direct communication with bus 44. Therefore, if CPU 42 receives an instruction to read data from data storage device 48, CPU 42 preferably cannot directly read such data by sending a command through bus 44 directly to data storage device 48. Rather, preferably CPU 42 must send the command to access control device 46, which then determines if such access should be granted and the data read from data storage device 48. Thus, more preferably, data can only be read from, and written to, data storage device 48 through access control device 46.

Access control device 46 is optionally implemented according to a plurality of different embodiments, at least partially determined by the particular type of data storage device 48. For example, access control device 46 could optionally be implemented as a chip, with a non-volatile memory which is both readable and writable, such as a flash memory device for example, some type of input for receiving a request for data, and a microprocessor. As described in greater detail below, the various types of permissions could optionally be stored on the non-volatile memory, along with a set of instructions operated by the microprocessor. The chip could also be implemented as a programmable ASIC.

When access control device 46 receives a request for particular data which is stored in data storage device 48, the stored instructions are executed by the microprocessor in order to compare the request for the data to the stored permissions. If the stored permissions are such that the data request may be fulfilled, as described in greater detail below, then access control device 46 enables data to be retrieved from data storage device 48. Otherwise, access control device 46 does not enable the data to be retrieved. Since preferably data storage device 48 can only be accessed through access control device 46, if such access is not granted by access control device 46, then the data cannot otherwise be retrieved.

Access control device 46 could also optionally be directly integrated into data storage device 48. For example, if data storage device 48 is a flash memory device, which is typically embodied as a chip, then the functions of access control device 46 could be integrated into the chip itself. For example, data storage device 48 could be incorporated into a single chip with a microprocessor for access control device 46, and firmware for operating the data access features. Alternatively, access control device 46 may optionally only feature logic, such that access control device 46 would interact with CPU 42 for operating software for interacting with the logic, and hence for performing the data access method of the present invention. Alternatively, access control device 46 and data storage device 48 may be implemented as a plurality of separate functional units which are not combined in a single chip.

However, the implementation of access control device 46 as a chip, or other electronic device, whether integrated into, or separate from, data storage device 48, is particularly preferred since such an implementation also enables the security of access control device 46 to be more easily maintained, as electronic hardware devices are more difficult to "hack" for unauthorized access. As described above, access control device 46 is preferably implemented as firmware, which combines software instructions stored on a hardware memory, with additional hardware components such as a microprocessor for performing the instructions.

According to preferred embodiments of the present invention, system 40 enables a plurality of different types of permissions for accessing data to be stored by access control device 46, such that a variety of different types of data access can be provided. As an example, one type of permission could be a standard read and write permission, but with write protection, such that access control device 46 would permit data to be read from data storage device 48, but would block an attempt to write data to data storage device 48. If such a permission is to be stored in an abbreviated code, the code for this particular type of permission could be given as "R/W/WP", for example. Such a code could optionally be stored in the non-volatile memory of access control device 46, for example. However, the permission is such that it could be changed to permit such write access, or a read and write permission with no write protection, with a code as follows: R/W/NP. These standard types of read and write permissions are often used for hard disks, floppy diskettes and other storage media, for example.

The present invention also preferably enables more complex types of permissions to be implemented. For example, the permission could be given as "write once and read many times", or "WO/RM" in code form, such that the data could only be written to data storage device 48 once, but could be read from data storage device 48 many times. One example of a useful implementation of such a permission is the storage of a picture for identifying a user, for example in order to permit access to a particular location.

Another type of optional but preferred implementation of a permission is "write once, no read, comparison with yes/no answer only", or "WO/NR/C" in code form. This type of permission indicates that the data can only be written to data storage device 48 once and cannot be read from data storage device 48. However, access control device 46 can enable the data to be compared with received data, but would only provide information in the form of a "yes" or "no" answer as a result of the comparison. One example of a useful implementation of such a permission is for a PIN (personal identification number) or other number for identifying a user, such as for accessing a bank account or using a credit card. Access control device 46 can receive data in the form of the PIN or other information entered by the user, and can then compare the received data to data which is stored in data storage device 48. Access control device 46 would then confirm whether the correct PIN or other identification information had been entered by returning a positive or negative comparison. The stored data would not be released from data storage device 48, such that the PIN could not be read from data storage device 48 by an unauthorized user. Thus, data security would be maintained, while still enabling the identity of the user to be confirmed according to an entered PIN or other identification information.

One variation of this type of permission incorporates permission, or lack thereof, for updating the stored data. With regard to the example above, the PIN or other identification information could optionally be changed for updating, if the permission is given as updatable, or WO/NR/CIU in code form. Alternatively, if the permission is given such that the data cannot be updated, or WO/NR/C/U in code form, then the data cannot be altered.

A more specific example of these different types of permissions, and their use thereof, is given below with regard to FIG. 5, which features a flowchart of an illustrative and exemplary method according to the present invention for controlling data access.

Figure 5:
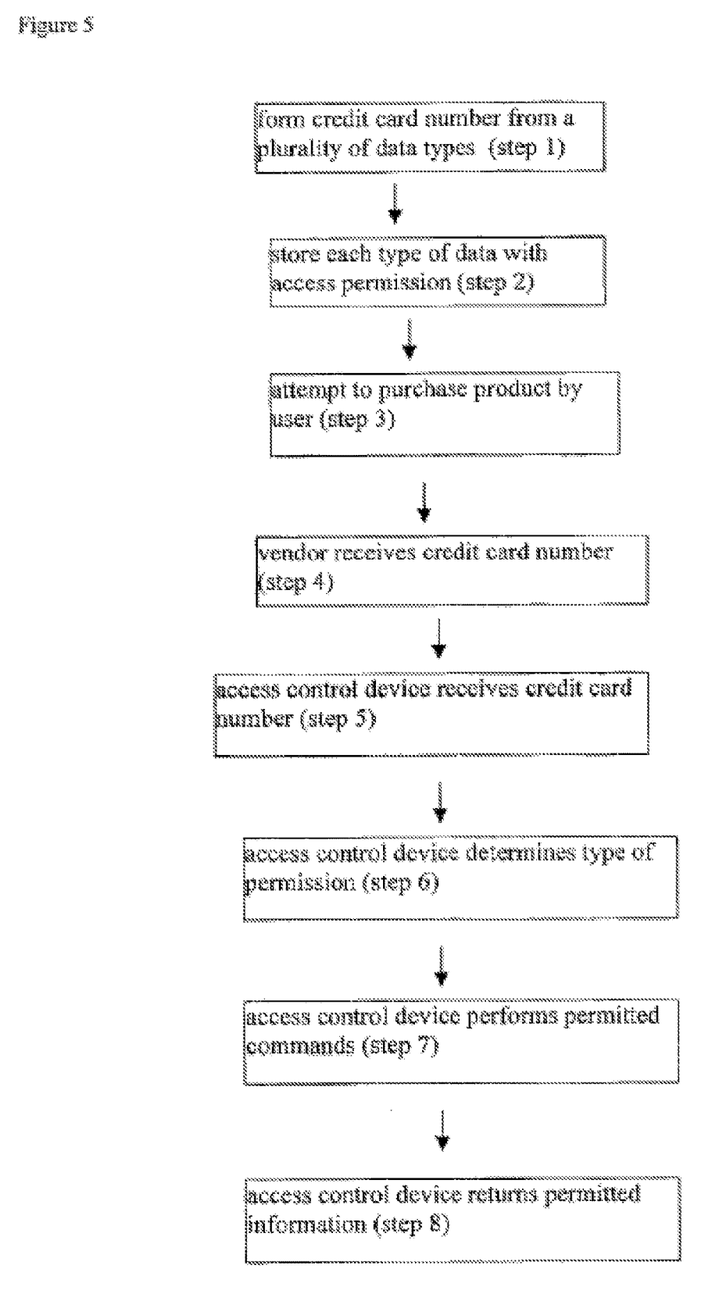
FIG. 5 shows a flowchart of an example of a method according to the present invention, with regard to access to data in the form of a stored credit card number.

FIG. 5 shows a flowchart of an example of a method according to the present invention, with regard to access to data in the form of a stored credit card number. In step 1, a plurality of different types of information are combined to form the credit card number. Preferably, the format of the credit card number is given as follows: YYYZZZDDDAAA, in which YYY is a code which identifies the originator of the credit card data, such as the provider of the credit card; ZZZ is an identification number for the credit card account, which currently forms the credit card number in background art implementations of a credit card; DDD, which optionally features other data about the credit card account, such as the date when the credit card was issued, where the credit card was issued, the expiration date and so forth; and AAA, which optionally and preferably is a PIN as previously described.

In step 2, each portion of the credit card number is stored with a separately selected and assigned data access permission, which optionally and preferably is different for each portion of the number. For example, preferably "YYY", "ZZZ" and "DDD" are each stored with the permission assigned as WO/RM (write once, read many times); AAA is preferably stored with the permission assigned as WO/NR/C/U (write once, do not read, compare only, updatable). These permissions are described in greater detail above.

In step 3, the user attempts to purchase a product with the credit card number. In step 4, the merchant or other party receiving the payment enters the credit card number. It should be noted that this step is optionally performed substantially automatically, for example for e-commerce through a Web site. In step 5, the access control device receives the credit card number.

In step 6, the access control device determines the type of permission for each portion of the credit card number. In step 7, the access control device performs the commands which are permitted, optionally including reading the portions of the credit card number which are designated as "YYY", "ZZZ" and "DDD", and performing a comparison with the portion of the credit card number which is designated as "AAA". In step 8, the permitted information is returned by the access control device. Thus, this illustrative method is an example of the utility of the present invention for validating a credit card number for performing a purchase.

Other types of data which could be stored with an assigned type of permission according to the present invention include, but are not limited to, an access control code, an identification code and various types of data files, as described in greater detail below.

For example, an access control code could be implemented with a combination of different types of data, each of which could again feature a separately selected and assigned data access permission, which optionally and preferably is different for each portion of the data. If the access control code is implemented as a number, then preferably these different types of data are as follows, with the data access permissions. The first portion of the access control code is optionally a code which identifies the data as an access control code, and which is preferably stored as "WO/RM". The second portion of the access control code is preferably the access code itself, and is preferably stored as "WO/NR/CIU".

Similarly, an identification code is optionally and preferably composed of a first portion which identifies the data as an identification code, and which is preferably stored as "WO/RM", and a second portion which is the unique identification code, for example for a hardware device, which is preferably stored as "WO/RM".

Other types of data files may be stored with associated permission types as desired, which are constructed as previously described. For example, most data files are preferably stored as "R/W" data, with the decision to permit writing to the data ("R/W/WP") or not to permit such writing ("R/W/NP"), decided according to user preference. Thus, the present invention can accommodate many different types of uses for the control of data access.

According to another optional embodiment of the present invention, data could be stored on the storage device according to a data access type which may be defined as "read a few times, then delete". According to this preferred type of data access, a file would be stored on the device of the present invention and could then be read only a predefined number of times, which preferably would be a plurality of different read times. After the data had been read the predefined number of times, the device of the present invention would then delete the data, or otherwise render the data inaccessible for an additional data read. This type of data access is preferred for file types such as MP3 music files, which may be provided by a vendor for only such a predefined number of data read accesses, for example in order to prevent the unauthorized redistribution of such files.

For any of the embodiments of FIGS. 1-5, optionally and preferably, the device features a modified user interface. More preferably, the device of the present invention does not feature a keyboard or a display screen. Instead, the device more preferably communicates with the user through audio data, such as through synthesized human speech for example. Additionally or alternatively, the device preferably provides information concerning the state of device operation with a LED, for example. Optionally and most preferably, the device is able to communicate more information about the state of device operation by sending an e-mail message or triggering the host computational device to send an e-mail message to a predetermined e-mail address. Thus, the device of the present invention is most preferably able to communicate with the user without a GUI (graphical user interface).

It will be appreciated that the above descriptions are intended only to serve as examples, and that many other embodiments are possible within the spirit and the scope of the present invention.

What is claimed is:

1. A removable storage device configured to communicate with a host device over a data connection, the removable storage device comprising:
    a memory for storing at least one permission for determining access to the memory;
    a processor for managing access to the memory, independently of the host device, based on a comparison of a request at the removable storage device to access the memory to at least one permission, the comparison being independent, requiring no management by an operating system of the host device, such that if the at least one permission includes a particular access type that matches the access requested in the request, the processor provides such access to the memory, and alternatively if the at least one permission does not include a particular access type that matches the access requested in the request, the processor denies such access to the memory; and
    a data controller for communicating with the host device via the data connection and, if permitted, for transmitting data from the processor.

2. The removable storage device of claim 1, further comprising: a RAM component for storing data for performing said at least one instruction of said data processor.

3. The removable storage device of claim 1, further comprising: a cryptographic chip for encrypting and decrypting data.

4. The removable storage device of claim 3, wherein said cryptographic chip performs an authentication process.

5. The removable storage device of claim 3, wherein said cryptographic chip emulates a smart card.

6. The removable storage device of claim 5, wherein said cryptographic chip stores encrypted smart card data.

7. The removable storage device of claim 3, wherein said cryptographic chip performs encryption immediately upon receiving a command from said processor.

8. The removable storage device of claim 7, wherein said cryptographic chip creates a cryptographic signature with a hash immediately upon receiving a command from said processor.

9. The removable storage device of claim 3, wherein said cryptographic chip further comprises a cryptographic chip memory for storing at least one cryptographic key and at least one cryptographic instruction for encrypting and decrypting data, such that said cryptographic chip forms a removable encryption engine.

10. The removable storage device of claim 9, wherein said encrypted data is stored on said cryptographic chip memory.

11. The removable storage device of claim 10, wherein said cryptographic chip memory is a separate memory device from said memory device.

12. The removable storage device of claim 10, wherein said cryptographic chip memory is said memory device.

13. A method for determining whether to provide access to a memory, the method comprising:
    receiving a request to access a memory at an access control module, independent of a host device, the access control module configured to communicate with the host device over a data connection; and
    managing access to the memory with a processor of the access control device, independent of the host device, based on a comparison of the request to at least one permission for determining access to the memory, the comparison being independent of, and requiring no management by, an operating system of the host device;
    wherein managing access to the memory comprises:
    providing, with a processor of the access control module, access to the memory in response to determining that the at least one permission includes a particular access type that matches the access requested in the request; and
    denying, with a processor of the access control module, access to the memory in response to determining that the at least one permission does not include a particular access type that matches the access requested in the request.

14. The method of claim 13, wherein credit card information is stored in the memory.

15. The method of claim 13, wherein biometric information is stored in the memory.

16. The method of claim 13, wherein audio information is stored in the memory.

17. The method of claim 13, wherein network access information is stored in the memory.

* * * * *